United States Patent
Cohen

Patent Number: 6,081,869
Date of Patent: *Jun. 27, 2000

[54] BIT-FIELD PERIPHERAL

[75] Inventor: Paul E. Cohen, San Jose, Calif.

[73] Assignee: NEC Electronics, Inc., Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/907,066

[22] Filed: Aug. 6, 1997

Related U.S. Application Data

[63] Continuation of application No. 08/337,792, Nov. 14, 1994, abandoned.

[51] Int. Cl.[7] .................................................. G06F 9/30
[52] U.S. Cl. ........................... 711/100; 711/1; 711/2; 711/3; 711/101; 711/202; 711/215
[58] Field of Search .................................. 711/2, 3, 100, 711/202, 219, 220, 1, 101, 215; 395/565

[56] References Cited

U.S. PATENT DOCUMENTS 4,028,670  6/1977  Hoffman et al. ............... 340/172.5
5,210,835  5/1993  Sakamura ........................ 395/365

FOREIGN PATENT DOCUMENTS

0535820A2  9/1992  European Pat. Off. ........ G06F 9/00

OTHER PUBLICATIONS

Motorola DSP56156 Digital Signal Processor User's Manual, DSP56156 Overview, ©1992, p. 1–29.

NEC Electrics, Inc., μPD70320/322 (V25) μPD70330/332 (V35) 16–Bit, Single–Chip CMOS Microcomputers User's Manual, Section 13, Instruction Set, ©1989, pp. 13–42 and 13–50.

*Primary Examiner*—Do Hyun Yoo
*Assistant Examiner*—Than Nguyen
*Attorney, Agent, or Firm*—Skjerven, Morrill, MacPherson, Franklin & Friel, L.L.P.; William W. Holloway

[57] ABSTRACT

A bit field system is disclosed which includes a processor as well as a bit field peripheral device which is accessed via dedicated bit field addresses. Such a system efficiently executes bit field operations. Additionally, such a system advantageously provides a processor which does not include an original bit field instruction set with the ability of performing bit field operations. Such a system also advantageously avoids difficulties involved in encoding bit field instructions.

22 Claims, 3 Drawing Sheets

BIT-FIELD PERIPHERAL

This application is a continuation of application Ser. No. 08/337,792, filed Nov. 14, 1994, now abandoned.

BACKGROUND OF THE INVENTION

The present invention relates to bit field operations and more particularly, to performing bit field operations using a peripheral device.

It is known for processors to perform bit field operations through mask and logical operations. Bit field operations are operations which manipulate a specific bit or group of bits within a word. Some processors speed these bit field operations by specialized bit field instructions within the processor instruction set.

Bit field instructions which perform the bit field operations involve more complicated operands than do most other processor instructions because bit field instructions involve variable sized operands that are located at arbitrary bit offsets within words. Examples of these operands are operands specifying the start and length of the bit field as well as operands relating to the location of the bit field in a register or in memory.

Providing the processor with hardware to interpret and execute the encoded bit field instructions may require increasing the size of the processor's instruction decoder to handle the bit field operations. Also, the processor hardware to execute the bit field instructions may require additional or wider data paths to accommodate the complex operands.

An example of a processor which executes a limited number of bit field instructions is available from NEC Electronics under the trade designation μPD70320/322. The μPD70320/322 processor provides an extract bit field operation and an insert bit field operation. The extract bit field operation extracts a bit field of a specified length from a memory location. The extracted bit field is right justified within a transfer register with any unused bits cleared. The byte offset of the destination bit field is determined by the contents of a register. The insert bit field operation inserts a bit field into a memory location. More specifically a right-justified bit field of a specified length is transferred from a register to a memory location. The offset of the destination bit field is determined by the contents of an offset register. The start of the bit field is then located using the bit offset operation. Bit fields using this instruction have no alignment requirements and can span one or more byte boundaries.

Another example of a processor which executes bit field instructions is a digital signal processor available from Motorola under the trade designation DSP 56156. This processor includes a bit field manipulation group of instructions. The group of instructions tests the state of any set of bits within a byte in a memory location and then sets, clears or inverts bits in the byte. Bit fields which can be tested include an upper byte and a lower byte in a 16-byte value. The carry bit of a condition code register contains the result of the bit test for each instruction. These bit field manipulation instructions are read modify write instructions and require two instruction cycles. Parallel data moves are not allowed with any of the bit field instructions. The bit field instructions include a bit field test low instruction, a bit field test high instruction, a bit field test and clear instruction, a bit field test and set instruction and a bit field test and change instruction.

SUMMARY OF THE INVENTION

It has been discovered that providing a processor with a bit field peripheral device which is accessed via dedicated bit field addresses, advantageously provides a system which efficiently executes bit field operations. Such a system advantageously provides a processor which does not include an original bit field instruction set with the ability of performing bit field operations. Such a system also advantageously avoids difficulties involved in encoding bit field instructions.

DETAILED DESCRIPTION

The following sets forth a detailed description of the best contemplated mode for carrying out the invention. The description is intended to be illustrative of the invention and should not be taken to be limiting.

Figure 1:
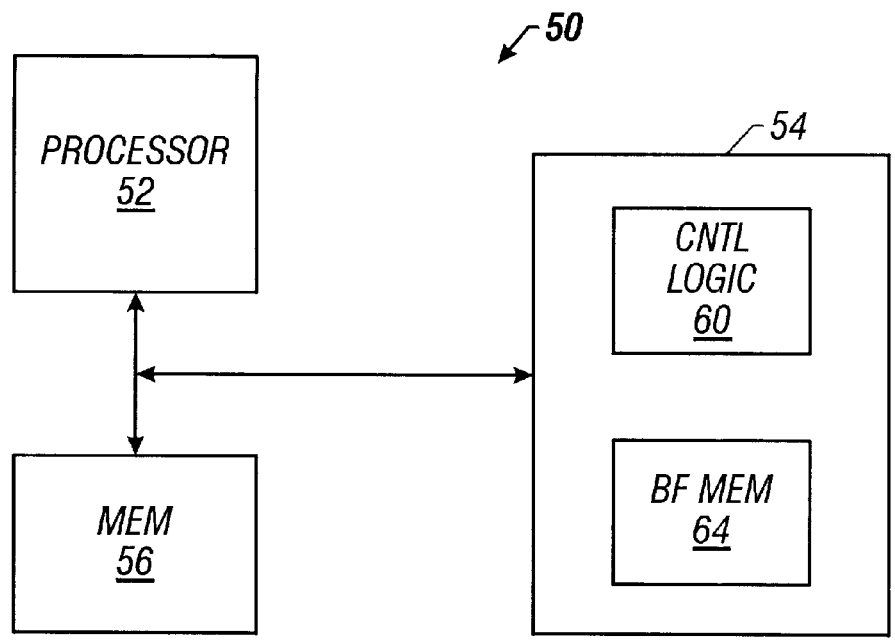
FIG. 1 shows a system having a bit field peripheral device in accordance with the present invention.

Referring to FIG. 1, bit field system 50 includes processor 52 which is coupled to bit field peripheral device 54. Processor 52 is, for example, a digital signal processor (DSP) available from N.E.C. Corporation under the trade designation μPD77017. Processor 52 is also coupled to memory 56. Bit field peripheral device 54 includes control logic 60 as well as bit field memory 64. Bit field peripheral device 54 is accessed by processor 52 via a bit field region of memory space and allows bit field system 50 to perform bit field operations which processor 52 is not specifically configured to execute. When processor 52 accesses a particular address within the bit field region of memory space, certain bits within the word are manipulated. Bit field peripheral device 54 may be integrated on the same integrated circuit chip as processor 52.

Figure 2:
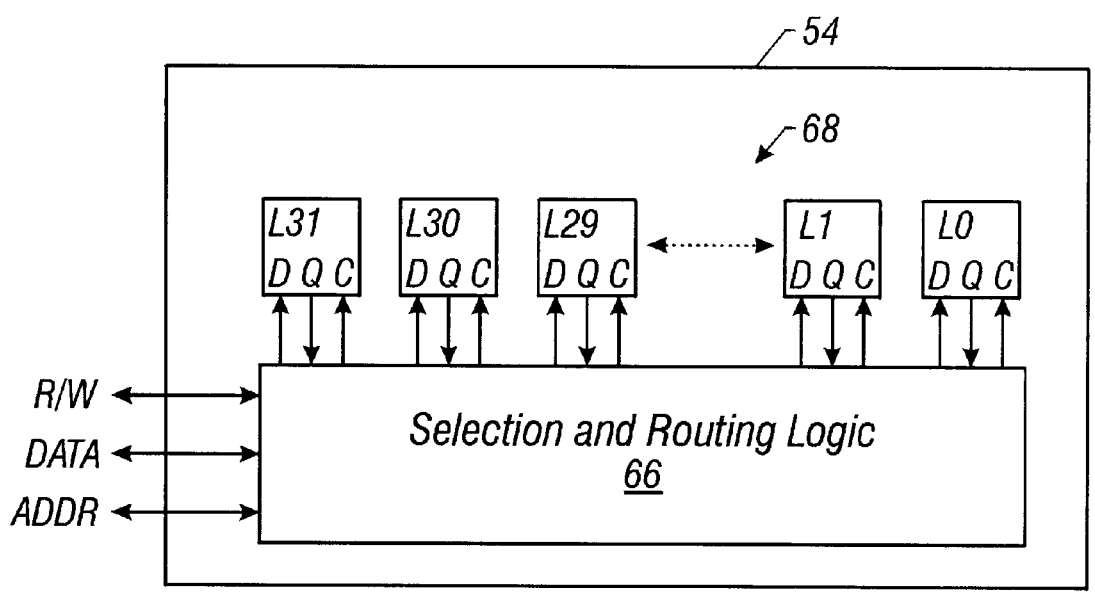
FIG. 2 shows a block diagram of the FIG. 1 bit field peripheral.

Referring to FIG. 2, control logic 60 of bit field peripheral 54 includes selection and routing logic 66. Selection and routing logic 66 is provided from hardware components such as a programmable logic array (PLA), discrete logic components or with an application specific integrated circuit (ASIC). Selection and routing logic 66 is coupled to access the read write (R/W) signal as well as the 16-bit data bus and the 16-bit address bus of system 50.

Bit field memory 64 includes 32 latches 68 which are identified as $L_0$–$L_{31}$. Latches 68 are coupled in parallel to selection and routing logic 66. The data and clock inputs (D and C, respectively) of each latch 68 are received from selection and routing logic 66 and the data output (Q) of each latch 68 is provided to selection and routing logic 66.

Selection and routing logic 66 determines which of the 32 latches of bit field memory 64 hold the data for the particular address of a called bit field instruction. In general, for $1 \leq j \leq 16$ and $0 \leq k < 16$ or for $j=k=16$, the address lines which are coupled to selection and routing logic 66 represent the value len<j>+k. Accordingly, when a particular address is called, then the latches which correspond to the particular address are set. More specifically, by providing an address map in which the low four bits of the address len<j> are equal to zero and the low four bits, k, of len<j>+k, provide the offset and the next four bits, j, provide the width of the bit field, then selection and routing logic 66 determines which latches to set and which latches to clear based upon this address map.

Generally, for the address len<j>+k, the R/W signal is routed to the C inputs of the j latches having an offset of k, i.e., the latches $L_k \ldots L_{k+(j-1)}$, and a high is routed to the remaining latches, i.e., 32−j latches. When the R/W signal is high, indicating a read, the low order j bits of data from data bus are routed to the selected latches, specifically, for $0 \leq i<j$, the input signal $D_i$ is routed to the D input of latch $L_{k+i}$. In the case of a read, selection and routing logic 66 pulls low all of the lines of the output data except the low order j lines of output data. For a write, the Q output of latch $L_{k+i}$ is routed to the output signal $D_i$.

For example, if the address has the value len2+3, then there are two latches active and these latches have an offset of 3. Accordingly, the latches $L_4$ and $L_3$ are active. The R/W signal is routed to the C input of the $L_4$ and $L_3$ latches and a high signal, which indicates a read, is routed to the remaining 30 latches. The low order two bits from data bus are routed to the D inputs of the $L_4$ and $L_3$ latches at the start of a write bus cycle and the two Q outputs of the two latches are routed to the two low order bits of data bus at the end of a read bus cycle. In the case of a read, selection and routing logic 66 pulls low all of the latch outputs except the two low order lines of the output data bus.

Figure 3:
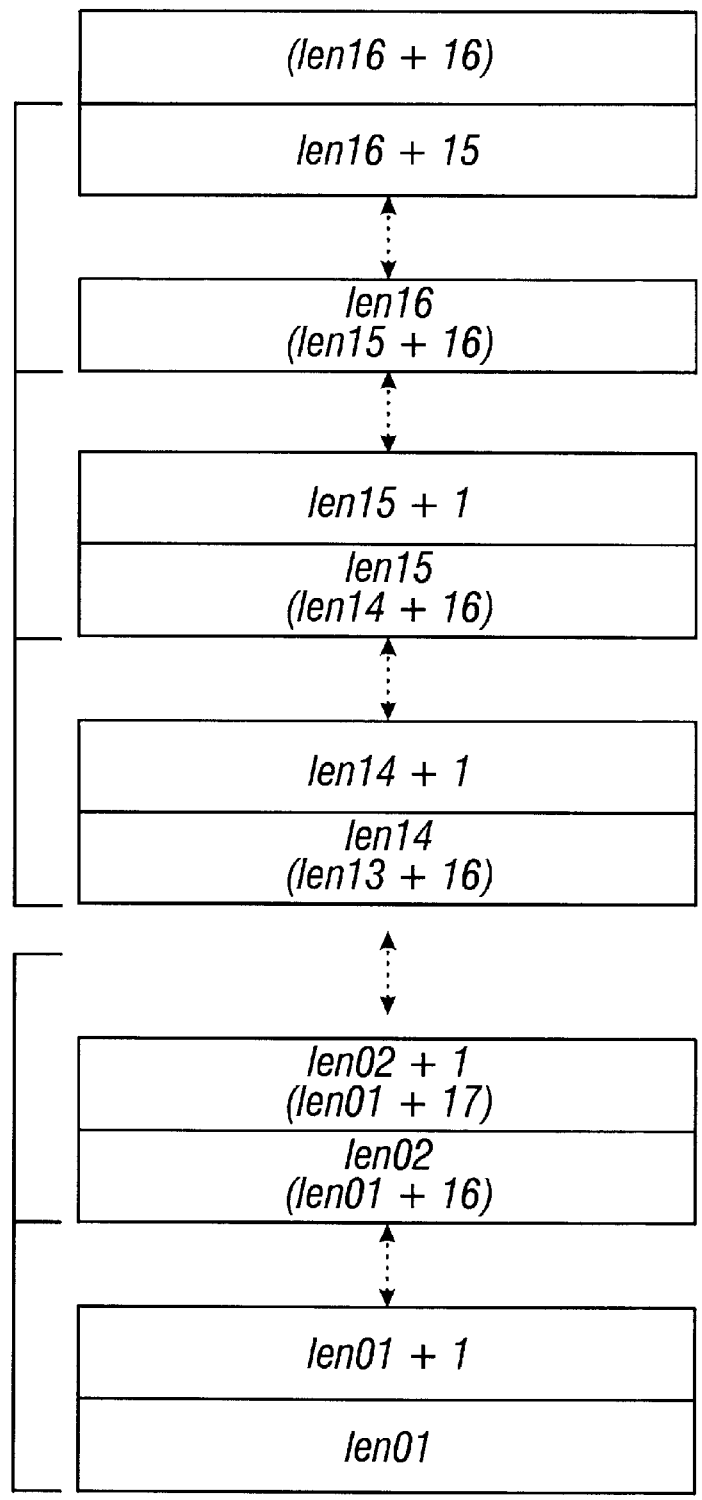
FIG. 3 shows an allocation of the memory of the FIG. 1 bit field peripheral device in accordance with the present invention.
Figure 4:
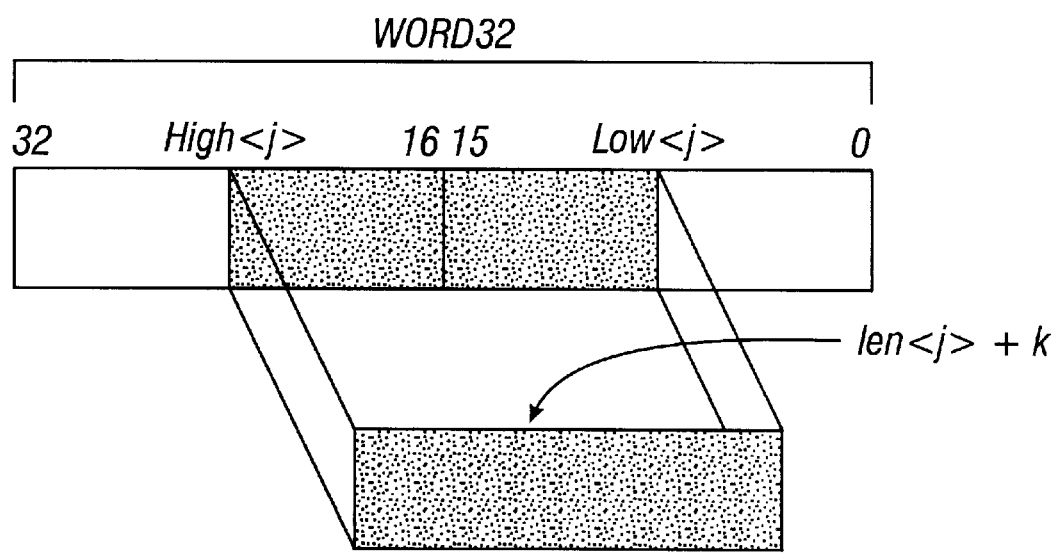
FIG. 4 shows a memory access of a bit field operation in accordance with the present invention.

Referring to FIGS. 3 and 4, in the preferred embodiment, processor 52 provides a dedicated bit field memory region which corresponds to the addresses of bit field memory 64. The bit field memory region includes 16*16+1=257 words of memory. These words divide naturally into sixteen blocks of sixteen words each plus one additional word. The sixteen different blocks start at memory locations len01<len02< . . . <len16

In general, the word which is accessed via an address starting at address len<j> have j significant (i.e., low order) bits with the remaining high order bits of each word always equal to zero. The offset from the base address of a block indicates the starting address of the active bits of the bit field. When performing a bit field operation processor 52 uses the various addresses of bit field address region to access the different bit combinations of bit field peripheral 54.

More specifically, the different bit combinations corresponding to the 257 different addresses are used to generate various bit field combinations of a 32-bit word. This 32-bit word, which is referred to as WORD32, is formed out of two 16-bit words of data, Low<j> and High<j> which correspond to addresses of the bit field address region which are separated by 16-bits. For example, the lower 16-bit word, Low16 is accessed by address len16 and the corresponding upper 16-bit word, High16, is accessed by address len16+16. More generally, the bit field of length j starting at bit k is addressed by the address len<j>+k. For example, (len15+k) is the address of a bit field of WORD32 that spans bits k through (k+14). Writing or reading a 16-bit value to the address len15+5 has the effect of writing or reading the eleven low order bits of that value to the high order bits of Low16; the high order bit is ignored but the next four high order bits of that value are either written to or read from the High16 word.

As another example, reading from the address (len03+7) provides data that always has bits 15 . . . 3 clear; bits 2 . . . 0 are the same as bits 9 . . . 7 of the word Low16. Reading from the address (len03+14) also provides data that always has bits 15 . . . 3 clear, but bits 2 . . . 0 of the word that is stored at that address (len03+14) are the same as bit 0 of the word High16, followed by bits 15 and 14 of the word Low16.

The sixteen addresses within the block of addresses starting at len01 are used to read or write the sixteen individual bits of the word Low16. No addressing is provided for the individual bits of the word High16 because the word High16 is provided only to accommodate overflow when reading or writing a bit field that does not entirely fit within the word of Low16. Accordingly, the High16 addresses are derived from and directly related to the corresponding Low16 addresses. For example, in the block starting at the address len02, only the word which is stored at the address len02+15 shares any bits with the word High16 because this is the only one of the two bit wide bit fields that overflows (i.e., that does not fall entirely within the word Low16). In contrast, the only word in the block starting at the address len16 that does not overflow into the word High16 is the Low16 word itself.

Bit field peripheral 54 may be used for decoding control channel data for U.S. digital cellular information. U.S. Digital Cellular base station broadcasts messages on a digital channel that is referred to as an analog control channel. Every 11th bit of data on this channel indicates whether some mobile station is currently being served on that channel. One of the steps in decoding a message from the base station is for the mobile station to discard every 11th bit from the data stream.

Table 1 sets forth a C code module for decoding control channel data and more specifically for removing the busy/idle bits from 400 bits of forward control channel data. This module assumes that all of the constant pointers, len01 . . . len16, High16 and Low16 have been defined prior to invocation of this module. Forward control channel is a cellular telephone communications channel that is defined in the IS-54-B digital cellular standard which was published in April of 1992 by the Electronics Industries Association and the Telecommunications Industry Association (EIA/TIA). The forward control channel is the channel that is transmitted from a base station and is used for initializing telephone calls.

TABLE 1

```
void
no_bi(short data[ ])
{ // Omit every 11 th bit of data[0 . . . 25]
short *in_dptr = data, *out_dptr = data;
short delete = 10, next_load = 16;
/* remove the bit at offset delete from the current word
*/
*Low16 = *in_dptr ++;   // load the first word
while (in_dptr < &data[26])
    {
    while (delete < next_load)
        {
        *(len16 + delete) = *(len16 + delete + 1);
        next_load--;
        delete = (delete + 11);
        if (next_load <= 16)
            {
            *(len16 + next_load) = *in_dptr ++;
            next_load += 16;
            }
        }
    if (delete > 15)
        {
        *out_dptr ++ = *Low16;
        *Low16 = *High16;
        delete -= 16;
        next_load -= 16;
        }
    if (next_load <= 16)
        {
        *(len16 + next_load) = *in_dptr ++;
```

TABLE 1-continued

```
        next_load += 16;
      }
    }
} // End of no_bi
```

The sequence of actions that occurs when the module no_bi(data) is executed by processor 52 and bit field peripheral 54 is set forth in Table 2.

TABLE 2

| | |
|---|---|
| 1. | Load word 0 |
| 2. | Remove bit 10 |
| 3. | Load word 1 at bit 15 |
| 4. | Pop word 0 |
| 5. | Load word 2 at bit 15 |
| 6. | Remove bit 5 |
| 7. | Pop word 1 |
| 8. | Load word 3 at bit 14 |
| 9. | Remove bit 0 |
| 10. | Remove bit 11 |
| 11. | Pop word 2 |
| 12. | Load word 4 at bit 12 |
| 13. | Remove bit 6 |
| 14. | Pop word 3 |
| 15. | Load word 5 at bit 11 |
| 16. | Remove bit 1 |
| 17. | Remove bit 12 |
| 18. | Pop word 4 |
| 19. | Load word 6 at bit 9 |
| 20. | Remove bit 7 |
| 21. | Pop word 5 |
| 22. | Load word 7 at bit 8 |
| 23. | Remove bit 2 |
| 24. | Remove bit 13 |
| 25. | Pop word 6 |
| 26. | Load word 8 at bit 6 |
| 27. | Remove bit 8 |
| 28. | Pop word 7 |
| 29. | Load word 9 at bit 5 |
| 30. | Remove bit 3 |
| 31. | Remove bit 14 |
| 32. | Pop word 8 |
| 33. | Load word 10 at bit 3 |
| 34. | Remove bit 9 |
| 35. | Pop word 9 |
| 36. | Load word 11 at bit 2 |
| 37. | Remove bit 4 |
| 38. | Remove bit 15 |
| 39. | Load word 12 at bit 16 |
| 40. | Pop word 10 |
| 41. | Load word 13 at bit 16 |
| 42. | Remove bit 10 |
| 43. | Pop word 11 |
| 44. | Load word 14 at bit 15 |
| 45. | Remove bit 5 |
| 46. | Pop word 12 |
| 47. | Load word 15 at bit 14 |
| 48. | Remove bit 0 |
| 49. | Remove bit 11 |
| 50. | Pop word 13 |
| 51. | Load word 16 at bit 12 |
| 52. | Remove bit 6 |
| 53. | Pop word 14 |
| 54. | Load word 17 at bit 11 |
| 55. | Remove bit 1 |
| 56. | Remove bit 12 |
| 57. | Pop word 15 |
| 58. | Load word 18 at bit 9 |
| 59. | Remove bit 7 |
| 60. | Pop word 16 |
| 61. | Load word 19 at bit 8 |
| 62. | Remove bit 2 |
| 63. | Remove bit 13 |
| 64. | Pop word 17 |
| 65. | Load word 20 at bit 6 |
| 66. | Remove bit 8 |

TABLE 2-continued

| | |
|---|---|
| 67. | Pop word 18 |
| 68. | Load word 21 at bit 5 |
| 69. | Remove bit 3 |
| 70. | Remove bit 14 |
| 71. | Pop word 19 |
| 72. | Load word 22 at bit 3 |
| 73. | Remove bit 9 |
| 74. | Pop word 20 |
| 75. | Load word 23 at bit 2 |
| 76. | Remove bit 4 |
| 77. | Remove bit 15 |
| 78. | Load word 24 at bit 16 |
| 79. | Pop word 21 |
| 80. | Load word 25 at bit 16 |

By executing this module using bit field peripheral 54, many lines of code are saved. Because if bit field peripheral 54 were not available, while much of the code for this module would be the same, the few lines that would be different would each have to be expanded into multiple lines of code. For example, when using bit field peripheral 54, line 14 of the module compiles into two or three lines of assembly code depending on the compiler design decisions when compiling the module. If this code were being executed without bit field peripheral 54, tens of lines would be needed to form masks and perform the necessary ANDing and ORing to accomplish the same result. Lines 19, 25, 26 and 32 of the module would be similarly affected if this code were being executed without bit field peripheral 54. In fact, any line of C code that references one of the 257 bit field addresses is faster because of bit field peripheral 54.

Other Embodiments

Other embodiments are within the following claims.

For example, for the bit field peripheral that is described above, not all subsets of WORD32 are represented in the memory region (only contiguous bit fields are shown). For most purposes, merely storing contiguous bit fields is sufficient. However, some applications may suggest other subsets of WORD32 that might be useful. For example, some speed up of the module set forth in Table 1 is accomplished by representing subsets defined by $mod(n,16) \neq k$. In this example, these are the bits that are cleared when executing the module. This is an example of arbitrarily providing other bit field combinations. Accordingly, additional subsets of WORD32 may be provided as part of the bit field address region. These additional subsets of WORD32 would then be accessed by particular addresses. Within bit field peripheral 54, selection and routing logic 66 would control which of the latches are active when a particular address accesses the bit field address region.

Also for example, other addresses could be provided for bit fields constructed out of order, e.g., with the bits reversed. Such bit fields are useful to bit reverse an entire word.

Also for example, other addresses could be provided for specialized computations, and thus to expand the instruction set of the processor. For example, some processors have an instruction to compute the number of high bits in a word. For a processor without such an instruction, an address may be provided in the peripheral so that the processor could read the count of high bits after writing one or more words at other addresses. Such an access would have no affect on the original data. Other computations are also possible. For example, logical combinations (e.g., ANDs, ORs, XORs, etc.) of data written to dedicated addresses could be computed and presented for the processor to read at other dedicated addresses.

What is claimed is:

1. A bit field peripheral device responsive to bit field addresses, the device for being coupled to a microprocessor to provide bit field processing capability to the microprocessor, the microprocessor having a memory unit coupled thereto, the memory unit including dedicated memory locations dedicated to the device, the device comprising:

bit field control logic for providing a bit field operation result to the microprocessor, the bit field operation result provided in response to a bit field address from the microprocessor, the bit field address accessing a memory location in the dedicated memory locations; and a bit field memory coupled to the bit field control logic, the bit field memory including a plurality of bit locations, the bit field control logic accessing at least one predetermined bit location of the bit field memory in response to the bit field address, the at least one predetermined bit location determined by the bit field address.

2. The bit field peripheral device of claim 1 wherein the bit field control logic includes selection and routing logic, the selection and routing logic controlling which bit locations of the bit field memory are accessed in response to the bit field address.

3. The bit field peripheral device of claim 1 wherein the bit field memory includes a plurality of individual memories corresponding to respective bit locations.

4. The bit field peripheral device of claim 3 wherein the plurality of individual memories are respective latches.

5. The bit field peripheral device of claim 3 wherein the bit field control logic includes selection and routing logic, the selection and routing logic controlling which of the plurality of individual memories of the bit field memory are accessed in response to the bit field address.

6. The bit field peripheral device of claim 3 wherein for $1 \leq j \leq 16$ and $0 \leq k < 16$ or for $j=k=16$, where j equals a width of a bit field and k equals a bit field offset, when a bit field address having a value len<j>+k is received by the bit field peripheral device, the selection and routing logic accesses j individual memories beginning at an offset from zero, the offset from zero being k.

7. The bit field peripheral device of claim 1 wherein:

the bit field address corresponds to an expanded instruction for a processor; and the bit field control logic performs the expanded instruction in response to receiving the bit field address.

8. A bit field system comprising:

a processor for generating bit field addresses;

a memory unit, the memory unit having dedicated storage locations assigned to the bit field system; and a bit field device coupled to the processor and to the memory unit to provide bit field processing capability for the processor, the bit field device receiving the bit field addresses from the processor, the bit field device including:

a bit field control logic for receiving the bit field addresses; and a bit field memory coupled to the bit field control logic, the bit field memory including a plurality of bit locations, the bit field control logic accessing bit locations determined by each bit field address in response to receiving each bit field address, wherein at least one bit field address implements a bit field operation, the bit field address accessing a dedicated memory location defined by the bit field address.

9. The bit field system of claim 8 wherein the bit field control logic includes selection and routing logic, the selection and routing logic controlling which bit locations of the bit field memory are accessed in response to each bit field address.

10. The bit field system of claim 8 wherein the bit field memory includes a plurality of individual memories corresponding to respective bit locations.

11. The bit field system of claim 10 wherein the plurality of individual memories are respective latches.

12. The bit field system of claim 10 wherein the bit field control logic includes selection and routing logic, the selection and routing logic controlling which of the plurality of individual memories of the bit field memory are accessed in response to each bit field address.

13. The bit field system of claim 10 wherein for $1 \leq j \leq 16$ and $0 \leq k < 16$ or for $j=k=16$, where j equals a width of a bit field and k equals a bit field offset, when a bit field address having a value len<j>+k is received by the bit field peripheral device, the selection and routing logic accesses j individual memories beginning at an offset from zero, the offset from zero being k.

14. The bit field system of claim 8 wherein each bit field address corresponds to an expanded instruction for the processor, and the bit field control logic performs the expanded instruction in response to receiving each bit field address.

15. A peripheral device responsive to selected addresses, wherein each selected address accesses a corresponding dedicated memory location of a memory unit while implementing read or a write instruction, the memory unit being coupled to the peripheral device, the device comprising:

control logic responsive to at least one selected address; and a memory coupled to the control logic, the memory including a plurality of bit locations, the control logic accessing predetermined bits of the memory in response to the selected address, wherein the at least one selected address corresponds to a bit field instruction, and the control logic implements the bit field instruction in response to receiving the at least one address.

16. In a bit field system including a processor, a memory and a peripheral device, a method for accessing arbitrary bit locations, wherein at least one accessing arbitrary bit locations implements a bit field instruction for the processor, the method comprising:

providing dedicated bit field memory locations in the memory;

providing a bit field memory block in the peripheral device, the bit field memory block including a plurality of bit locations;

accessing a memory location in the dedicated memory locations identified by an address generated by the processor; and accessing at least one bit location identified by the address received by the peripheral device from the processor.

17. The method of claim 16 wherein:

the dedicated memory locations include a first number of blocks of a second number of memory words; and the address includes:

a length parameter, the length parameter defining the length of a bit field and addressing the blocks of the dedicated memory locations; and an offset parameter, the offset parameter providing an offset of a starting bit of the bit field within a memory word and addressing the memory words within the blocks of the dedicated memory locations.

18. The method of claim 17 wherein the first number of blocks and the second number of memory words are the same number.

19. The method of claim 18 wherein the first number and the second number are 16.

20. The method of claim 16 wherein the accessing the at least one bit location comprises:

reading the at least one bit location.

21. The method of claim 16 wherein the accessing the at least one bit location comprises:

writing to the at least one bit location.

22. The method of claim 16 wherein the accessing the at least one bit location comprises accessing a first set of bit locations according to an expanded bit field instruction to the processor, the first set having a size which is at least one bit, the size of the first set corresponding to the address accessed by the processor.

* * * * *